Oct. 27, 1931.  L. A. BIEHLER  1,829,036
INTEGRATING DEVICE
Filed Aug. 15, 1927   3 Sheets-Sheet 1
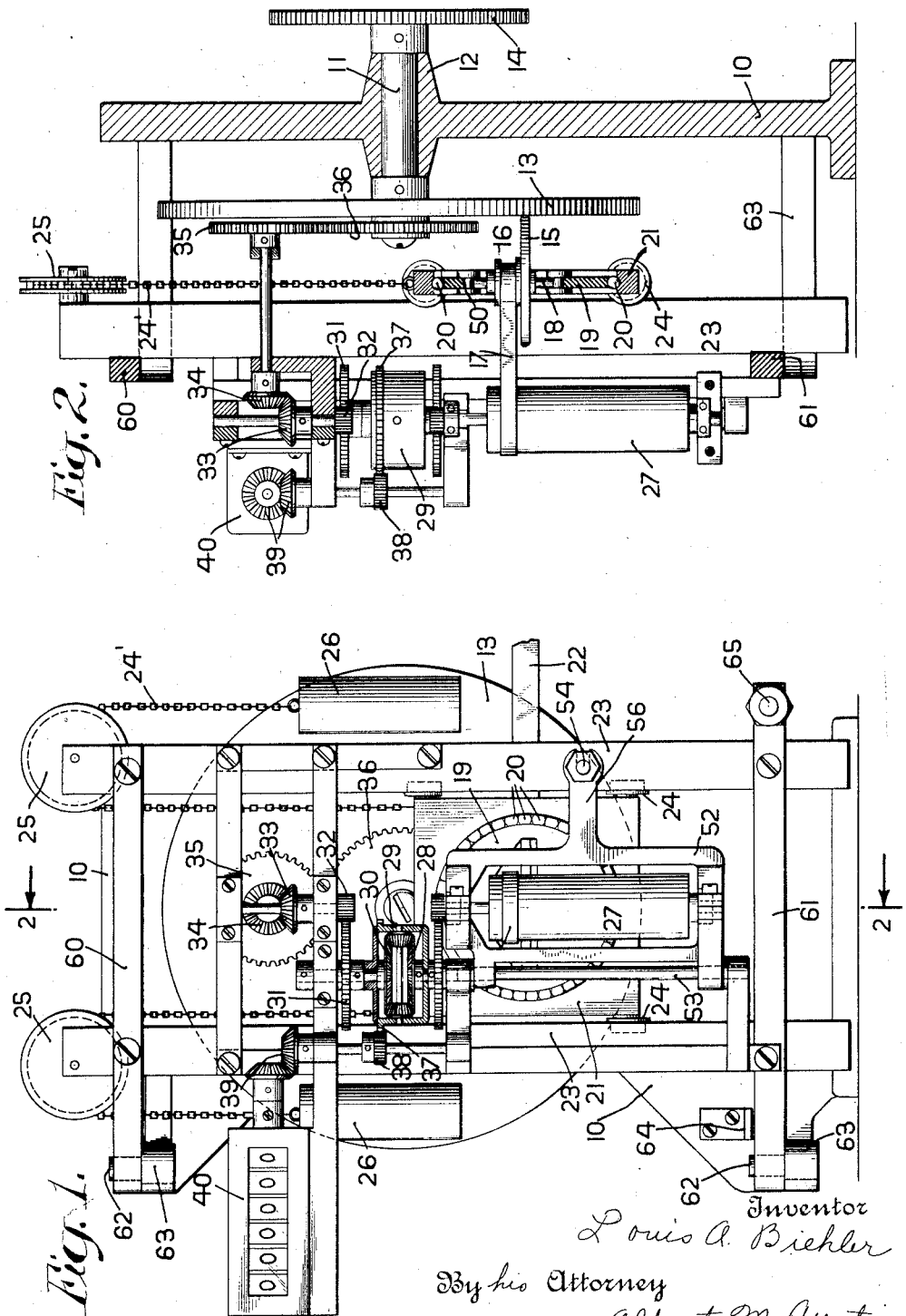

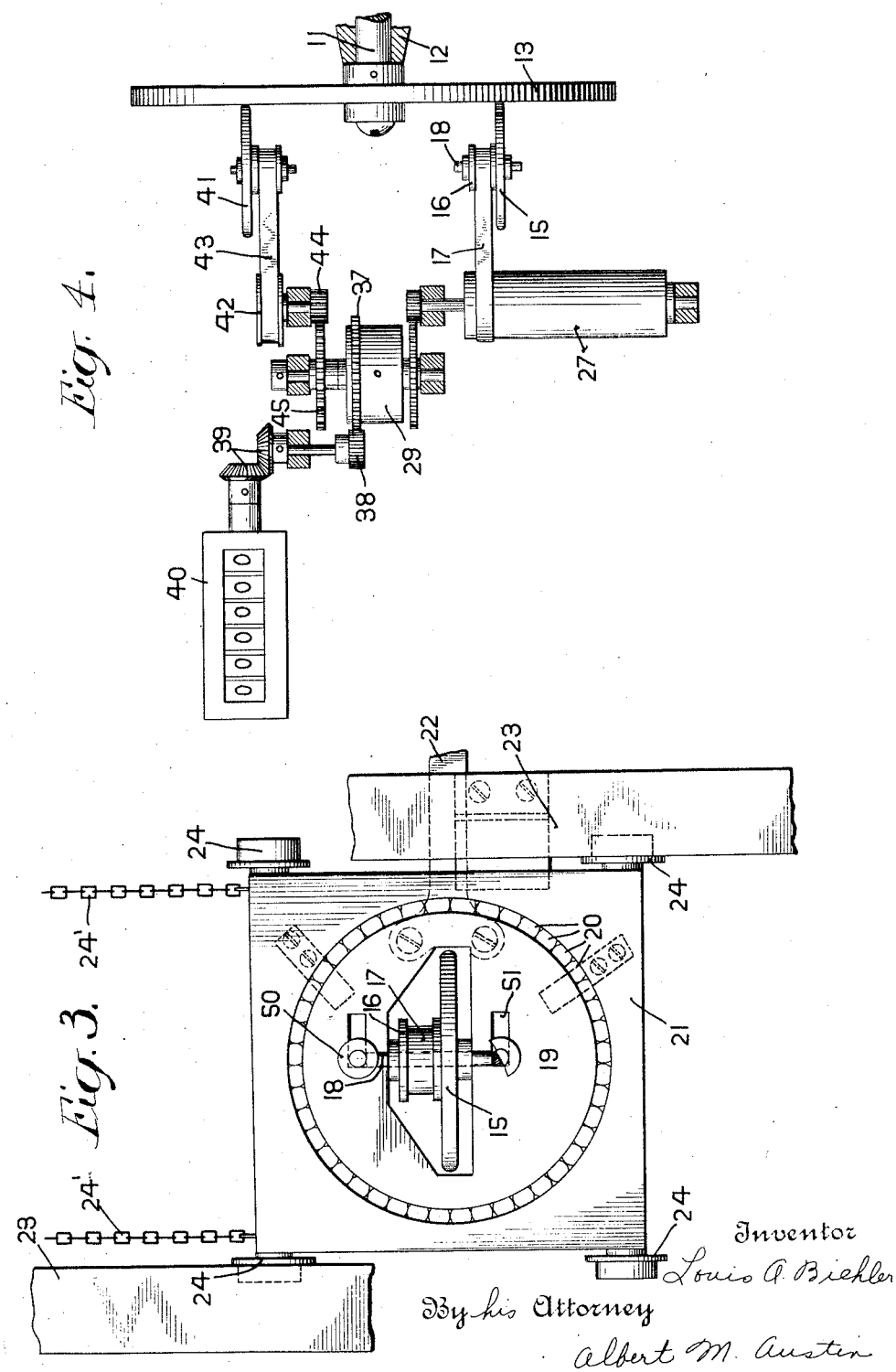

Oct. 27, 1931.  L. A. BIEHLER  1,829,036
INTEGRATING DEVICE
Filed Aug. 15, 1927   3 Sheets-Sheet 3
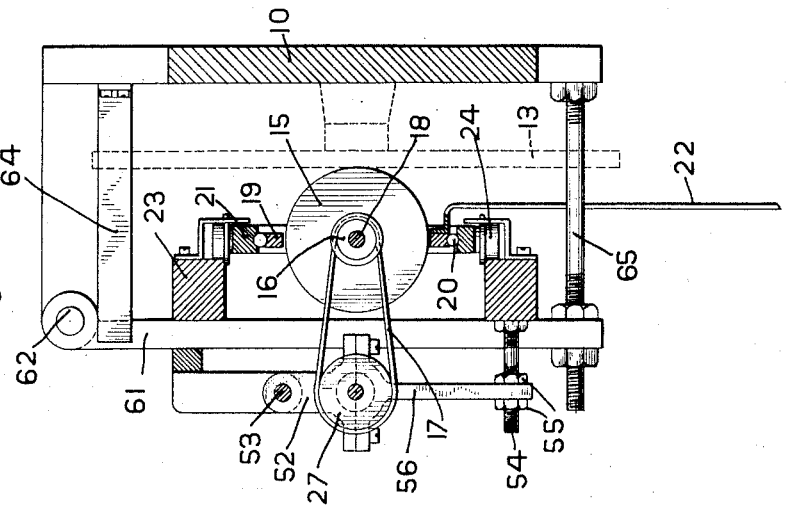
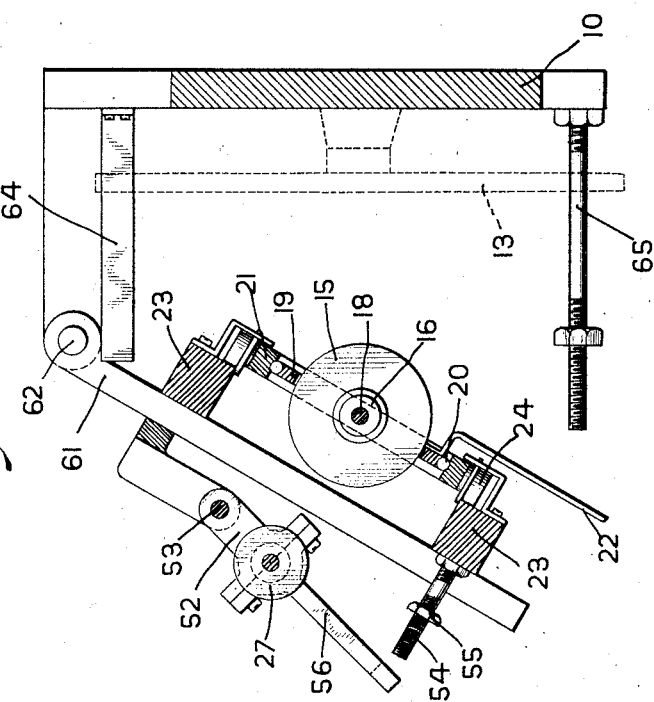
Inventor
Louis A. Biehler
By his Attorney
Albert M. Austin Patented Oct. 27, 1931

1,829,036

UNITED STATES PATENT OFFICE

LOUIS A. BIEHLER, OF STANHOPE, NEW JERSEY

INTEGRATING DEVICE

Application filed August 15, 1927. Serial No. 212,988.

This invention relates to a device for integrating or continuously summing up a series of quantities which are themselves the functions of two other quantities, either or both of which may be variable, and for showing or registering the continuously integrated result.

The invention involves, essentially, two elements, one of which is a rotating element or surface whose speed of rotation is a function of one of the quantities to be integrated, and the other wheel driven frictionally by the rotating surface and whose position with respect to the centre of rotation of said surface is a function of the second quantity to be integrated. The speed of rotation of the wheel varies with the speed of rotation of the rotating surface and also with its position with respect to the centre of rotation of said surface, and hence is a function of both of the elements it is desired to integrate. It may be counted or recorded by suitable mechanism.

The invention involves also novel means for causing the counting or recording device to remain stationary while at the same time maintaining rotation of the wheel when the second quantity is of zero value. This result may be obtained by locating the wheel when in position corresponding to zero value of the second quantity, at a suitable distance from the centre of rotation of the rotating surface and causing it to drive one gear of a differential at a certain speed. The other gear of the differential is constantly driven by any suitable means at the same speed but in the opposite direction. Consequently the differential housing will remain stationary while the second quantity is at zero value and the counting device, which is actuated by the differential will remain inactive.

Another feature of the invention resides in the means used to cause the wheel to assume automatically a variable position with respect to the centre of rotation of the rotating surface which position is a function of the second quantity.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which, Fig. 1 is an end elevation of the integrating mechanism Fig. 2 is a section taken on the line 2—2 of Fig. 1, Fig. 3 is an enlarged detail view of the friction wheel and frame, Fig. 4 shows diagrammatically a modified form of the integrating mechanism, Fig. 5 is a plan view of the device with the friction wheel and co-operating pulley swung back for dissembling, and Fig. 6 is a plan view of these parts in operative position.

Like reference characters denote like parts in the several figures of the drawings.

In the following description and in the claims the various parts of the apparatus and details of the invention will be identified by specific names for convenience, but they are intended to be as generic in their application as the art will permit.

In the drawings, a stand or frame 10 is shown rotatably supporting shaft 11 by means of a suitable bearing 12. To one end of said shaft is attached an upright rotatable disc 13 and at the other end thereof is a sprocket or gear 14 or other device for driving the shaft and disc. This sprocket or gear is driven by a suitable mechanism, not shown, actuated at a speed proportional to one of the quantities it is desired to integrate, and is moved in synchronism therewith. The disc 13 is thereby rotated at varying speeds proportional to the value of the quantity by which its speed is controlled. Said disc may, if desired, be faced with a suitable non-wearing friction material such as rubber.

A wheel comprising a rounded-edged friction disc 15 is held at right angles to and in contact with the face of the disc 13 having its axis normally vertical and intersecting the projected centre line of shaft 11 and being rotated by disc 13 through the frictional contact therewith. Flanged pulley 16 of lesser diameter than disc 15 is rigidly attached thereto and drives belt 17. Wheel 15 with its shaft 18 is mounted in a circular frame 19, which is cut to receive said elements. Shaft 18 is removably mounted in slots in frame 19 by means of thumb nuts 50 which are located on opposite sides of said frame and are joined by a shaft extending through said slots. Transverse slots 51 allow said thumb nuts to slide out of engagement with shaft 18 when the latter is to be removed as for the application of a new belt.

Frame 19 is adapted to rotate on ball bearings 20, carried in sliding frame 21. Frame 19 is tiltable in the plane of frame 21 by means of lever 22 being rigidly attached thereto and extending parallel to the plane of rotation of wheel 15. Hence, lever 22 is normally in a horizontal position. When facing the front of this integrator, said lever will preferably be on the left hand side of frame 21 if the rotation of disc 13 is counter-clockwise, and on the right hand side thereof if the rotation of the disc is clockwise. The frame 21 is capable of sliding up and down parallel to the face of disc 13 on upright track 23, rollers 24 being provided for contacting with said track. Cords or chains 24' attached to frame 21 and passing over sheaves 25 carry the counter-weights 26 which balance the weight of frame 21, circular frame 19 and wheel 15.

A rotatable drum or pulley 27 of width slightly greater than the maximum vertical movement of wheel 15 and its supporting frames is mounted in bearings in frame 52. Preferably ball bearings should be employed and arranged to be readily disassembled to permit easy removal of pulley 27. Frame 52 is pivoted on rod 53 concentric with the differential mechanism to be described and may be rotated thereabout as shown in Fig. 5 to render the parts accessible. Frame 52 may be locked in operative position by rod 54 and nuts 55 thereaded thereon, said rod passing through an aperture in arm 56 attached to said frame. Nuts 55 permit adjustment of the position of pulley 27 with respect to pulley 16 to apply the required tension to belt 17.

Pulley 27 is driven by wheel 16 through belt 17, which is free to move up and down on drum 27 as the wheel is moved upward or downward vertically in the manner which will be hereafter described. Drum 27 in turn drives gear 28 of differential 29. The other gear 30 of differential 29 is driven in the opposite direction at a speed proportional to the speed of rotation of disc 13 by a gear train comprising gears 31, 32, 33, 34, 35 and 36. Gear 36 is rigidly secured to shaft 11 and rotates with said shaft and with disc 13.

A gear 37 is mounted on the differential housing and engages and drives pinion 38. The latter in turn drives bevel pinions 39 thereby driving the counter 40 which may be calibrated to any desired scale.

The entire assembly including wheel 15 and gear 35 may be pivotally mounted as by bars 60 and 61 attached to guideways 23. Said bars may be supported by pins 62 attached to extensions 63 on stand 10. Stop 64 may overlie bar 61 when in operative position and prevent disengagement thereof. Suitable means such as threaded rod 65 may cooperate with bar 60 and permit angular adjustment thereof.

The frame may be swung away from disc 13 as shown in Fig. 5 to give access to the various parts and particularly for the removal of wheel 15 for the replacement of belts. Pulleys 16 and 27 being mounted on easily detachable bearings may be readily removed for inspection and repair and permit belt 17 to be installed without being disjointed.

Referring to the modification shown in Fig. 4, wheel 41, a duplicate of wheel 15, is held in a fixed position on the face of disc 13 on the opposite side of the center thereof from wheel 15 and at a distance from the centre corresponding to the distance of wheel 15 from the centre of disc 13 when in the zero position. Wheel 41 drives pulley 42 by suitable means, such as belt 43 and through gears 44 and 45 drives gear 30 of the differential 29. Wheel 41 and belt 43 therefore, correspond to the gear train 33—36 of Figs. 1 and 2.

In operation, for integrating the functions of two different quantities, one of these quantities A, will actuate the main driving gear 14, thereby driving this gear at a speed proportional to the value of quantity A. Disc 13 will therefore be rotated at a speed proportional to the value of quantity A. Through gear wheel 36 and the co-operating gear train, differential gear 30 will be caused to revolve at a speed having a constant ratio to the speed of revolution of disc 13 and therefore having a constant ratio to the value of quantity A. When wheel 15 is in certain position on the face of disc 13, hereinafter called the zero position, gear 28 will be driven thereby through belt 17 and drum 27 at exactly the same speed as gear 30 but in the opposite direction. Under these conditions the housing of differential 29 will remain stationary, the integrator will be neutral, and counter 40 will not register. This position of wheel 15 corresponds to the zero value of quantity B. It will be evident that when wheel 15 is in this position, the counter or register 40 will not and should not be actuated since element B is of zero value. It will also be evident that to secure this result it is necessary that the mechanism be so proportioned that the two gears 28 and 30 are caused to revolve at the same speed and in opposite directions when wheel 15 is at the zero or neutral point.

The second quantity B whose functions it is desired to integrate actuates mechanism attached to lever 22 near its outer end in such a manner that this lever will be moved downward or upward from the horizontal in exact proportion to the change in value of quantity B. This motion of the lever thereupon causes frame 19 to rotate in the frame 21 thereby causing wheel 15 to assume a position off the tangential to disc 13. As long as lever 22 is horizontal (in the form of construction herein described by way of illustration) wheel 15 also remains horizontal and its line of contact with the surface of disc 13 will be a circle of constant diameter to which it is tangent. But when thrown off the tangent, as by depression of lever 22 by a change in value of quantity B, wheel 15 and its carrying frames 19 and 21 immediately move outward toward the periphery of the disc. Since the frame 21 is limited to vertical movement by guideways 23, it must move downward until the wheel once more assumes a tangential position and lever 22 again becomes exactly horizontal. This movement of wheel 15 and its frame 21 in the guideways is rapid, occurring in practice substantially as quickly as the movement of lever 22, when disc 13 is rotating rapidly. The weight of wheel 15 and its carrying frames, being counterbalanced, offers no appreciable resistance to this movement.

The outward movement of wheel 15 therefore is exactly proportional to the depression of lever 22 and hence to the change in value of quantity B. As said wheel moves outward it will be caused to rotate faster because of the greater peripheral speed of the disc as the distance from its centre is increased. Therefore, the increase in speed of revolution of wheel 15 is in exact proportion to the depression of the lever—that is, to the increased value of quantity B. This will cause gear 28 to revolve faster than gear 30 and cause the differential to become operative in the well-known manner rotating the housing carrying gear 37 and in turn rotating pinion 38, gears 39 and causing counter 40 to register this rotation. It will be seen, therefore, that any change in the speed of rotation of disc 13, or any change in the position of the end of lever 22 will cause an increase or decrease in the speed of rotation of differential 29 which will be proportional to the functions of the two quantities actuating said disc and lever and which will be registered by counter 40.

It will be obvious of course that the disc 13 with its supporting frame need not be vertical, since as far as this invention is concerned it is only essential that wheel 15 shall revolve and be tiltable in planes perpendicular to the plane of disc 13 and shall be free to move inwardly or outwardly to and from the centre axis of disc 13 to a degree proportional to the value of quantity B. It has been shown as vertical herein for ease of description only.

As an illustration of the manner of using this integrator, it will be described as applied to the continuous weighing of material that is being transported by a belt conveyor over a scale.

In this example the two quantities to be integrated are (A) the speed of the conveyor belt, and (B) the load on that portion of the belt that is on the scale platform at any given instant.

Now if sprocket 14 be driven by a sprocket chain from the tail pulley of the belt conveyor, disc 13 will be caused to rotate at a speed proportional to the speed of the belt conveyor.

Again, if the lever system of the scale be attached to lever 22 in such a manner that when there is no load on that portion of the belt on the scale platform, lever 22 will be horizontal with wheel 15 at the neutral or zero point, but that when load is applied lever 22 will be depressed to a degree proportional to the load, wheel 15 will take a position on disc 13 corresponding to the load. Consequently, the speed of rotation of wheel 15 will be proportional both to the speed of the belt conveyor and to the load it is carrying, and the integrated result will be shown on the counter or register.

Thus, with no load on the belt conveyor, wheel 15 will rotate at the neutral or zero speed, the differential housing will remain stationary, and no weight will be shown by the counter or recorder. As soon as material is charged on the conveyor and reaches the scale platform, the lever will be depressed, wheel 15 caused to rotate more rapidly and the differential will move, thereby causing the counter, which of course must be suitably calibrated, to show the amount of the material transported in any desired period.

By the use of the differential, above described, it is possible to locate the zero point at a circle on the surface of the disc some distance from the centre and thereby have the wheel 15 revolving at all times. Since the wheel is revolving, the moment it is tilted it must move in one direction or the other, corresponding to the angle of the tilt. If a single tilting wheel alone were used without a differential, the wheel would have to assume a position at the exact centre of the disc to be at a zero point with respect to quantity B. At this point in the centre of the disc the wheel would be in neutral but it would not be revolving. Hence, tilting the wheel could have no effect and it would still remain in the centre of the disc, without revolving and not being able to move in one direction or the other.

Another advantage made possible by the differential and the location of the zero circle out from the centre of the disc in the manner shown is that if the movable wheel is tilted in the reverse position when it is standing at the zero point—in other words, if quantity B acts to raise the end of the lever instead of to depress it—the wheel will move toward the centre of the disc where it will then travel at a slower number of revolutions than the fixed wheel and will cause the integrator and counter to deduct instead of to add. This feature is particularly valuable when the integrator is adapted for the automatic weighing of material which is being transported over a conveyor.

Furthermore, the mechanism constructed in accordance with this invention is easy to keep in operative order and to repair, and may readily be understood by the ordinary skilled mechanic, thereby simplifying the repair and maintenance of the apparatus and avoiding the necessity of employing highly skilled or special operators in its use.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. An integrating mechanism comprising a rotatable friction member and a cooperating wheel driven thereby, said wheel being normally disposed with its axis of rotation intersecting the axis of rotation of said member and means for causing the axis of rotation of said wheel to extend at an angle to the normal line thereof, whereby said member causes said wheel to automatically move radially thereof until said axis again assumes its normal line.

2. An integrating device comprising a rotating disc and friction wheel associated therewith and normally disposed with its axis of rotation intersecting the axis of rotation of said disc, means for angularly varying the axis of rotation of said wheel whereby said disc causes said wheel to move radially thereof, a belt pulley attached to said wheel, a belt thereon cooperating with a cylindrical surface having an axis disposed parallel to the axis of said wheel, a differential having a pair of main gears, one of said gears being driven by said cylindrical surface, the other of said gears being driven in the opposite direction at a speed proportional to the rotation of said disc, said differential housing being adapted to remain stationary when said gears are rotating at the same speed and means for measuring the rotation of said housing.

3. In a mechanism for integrating two quantities, the combination of a rotating disc driven at a speed proportional to the value of one quantity, and a wheel in friction contact with the face of the disc and driven by the disc, said wheel being mounted so as to be tiltable with respect to the axis of rotation of said disc by the action of the second quantity, and so mounted as to be movable radially of said disc and means whereby the radial movement of said wheel again brings the axis of rotation of said wheel into its original position, the amount of movement being proportional to the value of the second quantity.

4. An integrating mechanism comprising a rotating disc driven at a speed proportional to one element to be integrated, a wheel mounted with its axis parallel to the surface of said disc and normally intersecting the axis of rotation of said disc and having its edge in friction contact therewith whereby said wheel is driven by said disc, said wheel being so mounted as to be tiltable with respect to a tangent to said disc, means for guiding said wheel radially of said disc while maintaining the edge in friction contact with the surface thereof, means for tilting said wheel by an angle proportional to the second element to be integrated, whereby said wheel is driven by said disc away from or toward the centre thereof and caused to rotate at a variable speed proportional to the variation in the element causing said tilting.

5. An integrating mechanism comprising a rotating disc driven at a speed proportional to one element to be integrated, a wheel having its edge maintained in friction contact with the surface of said disc and driven thereby, said wheel being tiltable about an axis normal to the surface of said disc, means for guiding said wheel radially of said disc, means for tilting said wheel by an angle proportional to the second element to be integrated, whereby said wheel is caused by said disc to move away from or toward the centre of said disc and to rotate at a variable speed proportional to the variation in the element causing said tilting, a differential, one element of said differential being driven by said wheel at a rate proportional to said second element to be integrated, means for driving the second element of said differential at a fixed rate with respect to said disc and in the opposite direction from said first element whereby the differential housing remains stationary when said second element to be integrated is at zero, and means actuated by said differential for counting or registering the motion of said differential.

6. An integrating mechanism comprising a rotating disc driven at a speed proportional to one element to be integrated, a wheel mounted with its center axis parallel to the surface of said disc and having its edge in friction contact therewith whereby said wheel is driven by said disc, said wheel being so mounted as to be tiltable with respect to a tangent to said disc, means for guiding said wheel away from or toward the centre of said disc while maintaining the edge in friction contact with the surface thereof, means for tilting said wheel by an angle proportional to the second element to be integrated, whereby said wheel is caused by said disc to move away from or toward the centre of said disc and to rotate at a variable speed proportional to the variation in the element causing said tilting, a differential, one element of which is driven by said wheel at a rate proportional to said second element to be integrated, means for driving the second element of said differential at a fixed rate with respect to said disc and in the opposite direction from the first element whereby the differential as a whole is stationary when the second element to be integrated is at zero point, and means actuated by said differential for registering the motion of said differential in terms of the elements to be integrated.

7. An integrating device comprising in combination a revolving disc, a wheel frictionally driven by contact with the surface of said disc and normally in a fixed neutral position, said wheel being tiltably mounted, means for tilting said wheel, whereby said disc causes said wheel to move radially of said disc until the axis of rotation is restored to its original position and to revolve at a speed proportional to the degree of said tilting, a differential which is actuated by said wheel in all positions of said wheel except neutral, and a counter actuated by said differential.

8. An integrating mechanism comprising a rotatable friction element, a cooperating wheel frictionally driven thereby, said wheel being normaly disposed with its axis of rotation intersecting the axis of rotation of said element, means for causing the axis of rotation of said wheel to extend at an angle to the normal line thereof whereby said element causes said wheel to automatically move along the surface thereof until said axis again assumes its normal position.

In testimony whereof I have hereunto set my hand.

LOUIS A. BIEHLER.